Oct. 23, 1923.

E. M. ROBINSON

POULTRY FEEDER

Filed July 24, 1918

Witnesses

Inventor
E. M. Robinson
By Victor J. Evans
Attorney

Oct. 23, 1923.
E. M. ROBINSON
POULTRY FEEDER
Filed July 24, 1918     3 Sheets-Sheet 2
1,471,919
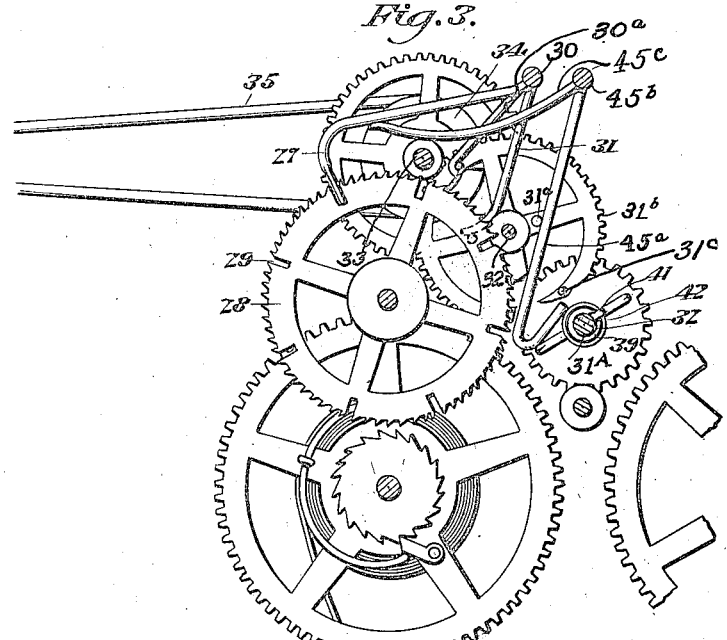
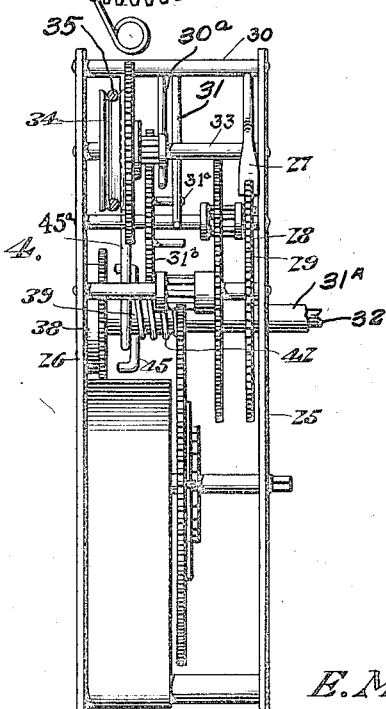
Witnesses
Inventor
E. M. Robinson
By Victor J. Evans
Attorney Oct. 23, 1923.
E. M. ROBINSON
POULTRY FEEDER
Filed July 24, 1918
1,471,919
3 Sheets-Sheet 3
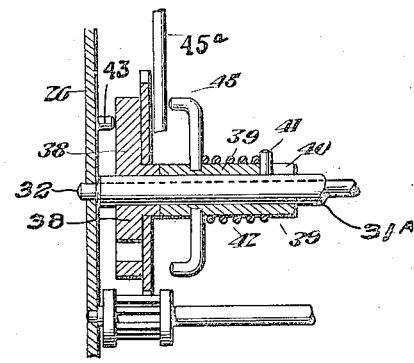
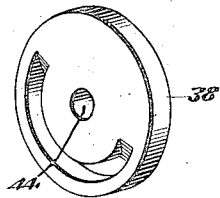
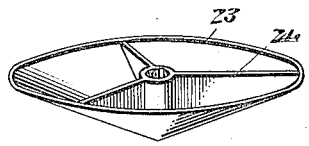
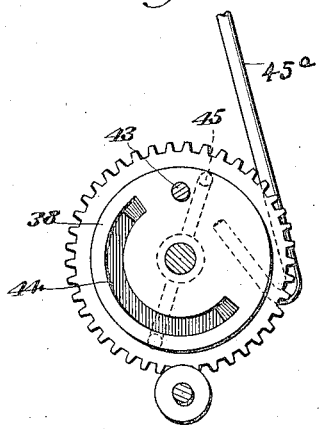
Inventor
E. M. Robinson
By Victor J. Evans
Attorney
Witnesses Patented Oct. 23, 1923.

1,471,919

UNITED STATES PATENT OFFICE.

EMERY M. ROBINSON, OF RIVER ROUGE, MICHIGAN.

POULTRY FEEDER.

Application filed July 24, 1918. Serial No. 246,550.

*To all whom it may concern:*

Be it known that I, EMERY M. ROBINSON, a citizen of the United States, residing at River Rouge, in the county of Wayne and State of Michigan, have invented new and useful Improvements in Poultry Feeders, of which the following is a specification.

This invention relates to feeding apparatus and is especially adapted for poultry feeding.

An object of the invention is to provide an automatically operating mechanism, which will distribute a predetermined quantity of feed automatically and at regular intervals, provision being made for automatically discontinuing the distribution of the feed during certain hours.

Another object of the invention is to provide means for distributing the feed broad cast so that the apparatus may be positioned within a poultry house and the feed evenly distributed in the litter therein.

With the above and other objects in view the invention broadly stated, includes a feed hopper having mounted therein an agitator, the latter being normally inactive and geared to a suitable mechanism in a manner to rotate the agitator at regular intervals, the number of rotations at each operation of the mechanism being the same, so that an equal amount of feed will be distributed.

The invention further consists of the following novel construction, combination and arrangement of parts to be hereinafter more fully described and claimed and illustrated in the accompanying drawings.

In the drawings:—

Figure 3 is an enlarged front elevation of the mechanism, parts of the mechanism which are not important to the understanding of the present invention being omitted;

Figure 4 is a side elevation of the subject matter of Figure 3;

Figure 5 is a detail vertical sectional view through a portion of the mechanism illustrating the means for preventing the operation of the mechanism;

Figure 6 is a detail view of the cam disk for controlling the operation of the mechanism.

Figure 7 is a detail perspective view of the feed distributor.

Figure 8 is an elevation of the cam disk and contiguous mechanism.

Referring to the drawings in detail, like characters of reference denote corresponding parts throughout the several views.

Figure 1:
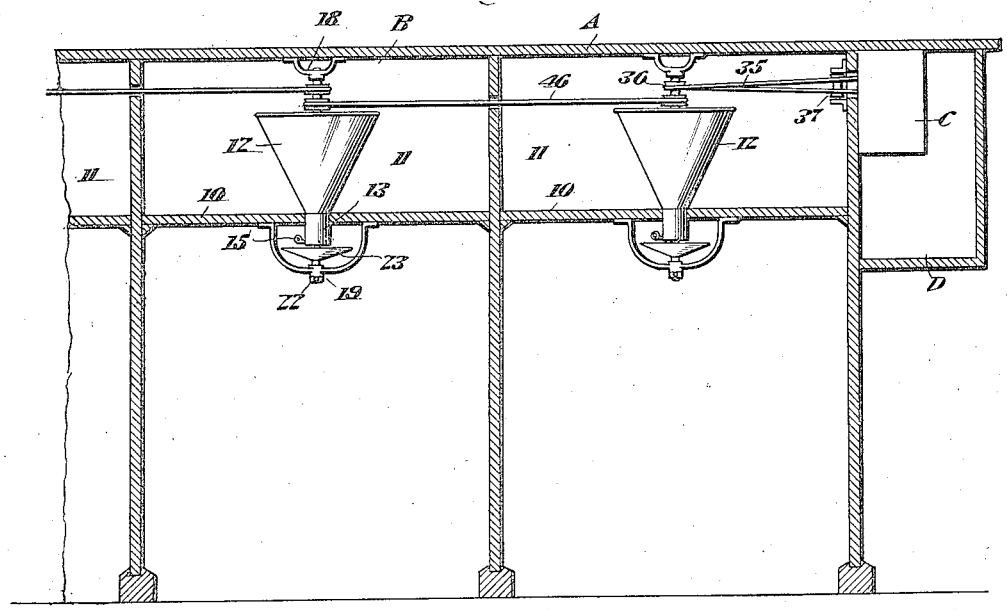
Figure 1 is a section though a poultry house provided with a number of individual compartments or sections and having the invention in position therein.
Figure 2:
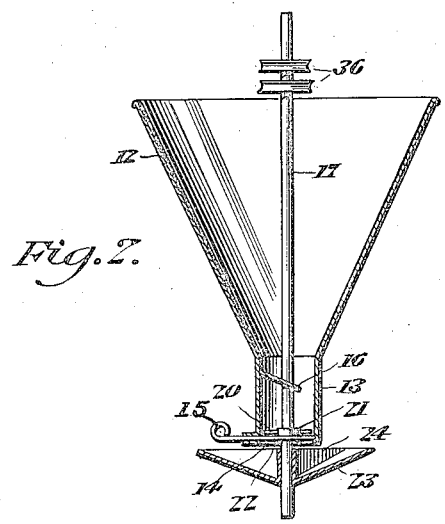
Figure 2 is an enlarged sectional view through the hopper.

The invention as illustrated in the accompanying drawings, is susceptible of various applications, but is shown as applied to a battery of poultry houses, the houses being indicated at A and B, while a compartment C is provided for housing operating mechanism to be hereinafter described.

Each of the houses A and B are divided by a horizontal partition 10, which forms the ceiling for a compartment in which the fowls are housed, a compartment 11 being formed upon the other side of the partition or ceiling 10. In this compartment is located a hopper 12, having a restricted outlet neck 13 and a further restricted outlet opening 14. The opening 14 is adapted to be regulated by a slide 15, which may be adjusted so that the hopper will deliver just the required amount of food at each feeding. In order to restrict the passage of the food through the neck 13 and to relieve the weight from the slide 15, there is provided an inclined plate 16, located within the neck. This plate is secured to one of the walls of the neck and terminates short of the other wall so as to provide room for the passage of the feed.

Extending vertically through the hopper 12 is a shaft 17, the upper end of which is mounted in the bearing 18, while the lower end extends through the ceiling 10 and is mounted in the bearing 19 suspended from the said ceiling. The shaft 17 carries radially and outwardly extending agitator fingers 20, which rotate within the hopper 12 when the shaft is revolved to break up or agitate the food and to force its passage through the outlet opening 14. Also mounted upon the shaft 17 is a collar 21, to which the fingers 20 are secured, so that rotation of the shaft will move the agitator fingers over the slide 15. A similar collar 22 is secured upon the lower end of the shaft 17 for engagement with the bearing 19.

Mounted upon the shaft 17 beneath the outlet opening of the hopper 12 is a distributor, consisting of an inverted shallow conical or dish shape disk 23, which is adapted to receive the food as it falls from the hopper. When this distributor is rotated the food will be thrown broad cast by centrifugal action and will be evenly distributed in the litter or other covering of the floor of the house. The distributor is provided with a plurality of vertically disposed radial partitions 24, which further aid in the distribution of the feed, certain parts of which will strike against the said partitions and be deflected in a different direction from that portion of the feed which passes through the distributor unobstructed. By this means a greater and more even distribution of the contents of the hopper is obtained.

The agitator fingers 20 are normally stationary and the feed within the hopper will pass through the outlet opening 14 only when the said fingers are operated. In order to operate the shaft 17 to operate the fingers, there is provided a novel form of time mechanism, which is located in the compartment C, which may be provided in one corner of a separate room D used in connection with the poultry houses for the storage of feed or for other purposes. The time mechanism employed for operating the shaft 17 consists of an ordinary clock mechanism provided with striking mechanism, the latter being modified to adapt it for the purpose intended. The mechanism illustrated includes the usual front and rear frames 25 and 26 which carry both the time and striking mechanisms. The striking mechanism includes the usual finger 27, which is adapted to engage slots in the periphery of a toothed wheel 28, which is driven by the mechanism in the usual manner. The slots 29 provided in the periphery of the wheel 28 are equally spaced apart and in this respect differ from the slots formed in a similar wheel used in connection with the ordinary striking mechanism. The shaft 30 upon which the finger 27 is mounted also carries an arm 31, which is acted upon by pins 31$^a$. These pins are carried by a gear 31$^b$.

Mounted upon the arbor 33 is a pulley 34, this pulley being fast upon the arbor 33 which is driven from the gear 31$^b$. The pulley 34 is connected by means of a belt 35, with a double grooved pulley 36 fast upon the shaft 17. When either of the arms 45 engage the arm 45$^a$, the latter will through the instrumentality of the arm 45$^c$, raise the arm 27 from one of the notches 29 of the wheel 28 and the pins 31$^a$ engage the arm 31 to successively lift the said arm 27 from engagement from the teeth between the notches, so that the mechanism will operate until the arm 27 enters the next succeeding notch 29. The wheel 31$^b$ is locked against movement by means of an arm 30$^a$ which is secured to the shaft 30 and engages pins 31$^c$ carried by the gear 31$^b$, the latter being released as soon as the arm 27 is elevated through the operation of the arms 45. By this means each time the striking mechanism of the clock or time mechanism is operated, the pulley 34 will be rotated and through the belt 35 and pulley 36 rotate the shaft 17. This will revolve the agitator fingers 20 and cause a portion of the contents of the hopper to pass through the outlet opening 14. This operation will continue during the operation of the striking mechanism and will be repeated at intervals throughout the day. The poultry will thus be given only a certain amount of food at stated intervals, which is advantageous with the care of fowls. If necessary an idler 37 may be interposed between the pulleys 34 and 36 in the path of the belt 35.

In order to interrupt the operation of the mechanism during a period of the twenty-four hours of the day, for example during the hours when the fowls are roosting, there is provided a disk 38. This disk is mounted to rotate with the arbor 32 which has mounted thereon a sleeve 31$^A$, which is connected to the hour arbor, the disk 38 being mounted upon this sleeve, but capable of longitudinal movement thereof. Mounted on the sleeve 31$^A$ is a sleeve 39, which is slotted as shown at 40 for sliding movement with the pin 41 extending in the arbor 32. The disk 38 is urged toward the rear frame 26, near which it is positioned, through the action of a coiled spring 42. Extending from the frame 26 inwardly is a stud 43, which is adapted to engage the adjacent face of the disk or an arcuate slot 44 provided therein. This slot has its end walls bevelled, so that the disk during its rotation will engage the pin in the slot and be positioned substantially in contact with the rear frame, a continued rotation of the disk causing the inclined end walls to ride upon the end of the pin and force the disk away from the rear wall against the action of the spring. Carried by the sleeve 39 is a pair of radially disposed fingers 45, the said fingers being provided with right angular extremities, which are adapted to engage an arm 45$^a$, which is carried by a shaft 45$^b$. This last named shaft also carries an arm 45$^c$ which engages the arm 27 to lift it from engagement with the toothed wheel 28. The slot 44 of the disk 38 extends substantially one-half way around the disk, so that for twelve hours of the twenty-four the disk will be positioned substantially in contact with the rear frame 26 and for the other twelve hours spaced therefrom. The fingers 45 are so positioned with respect to the arm 45$^a$, that when the said disk is in contact with the plate 26, the said fingers 45 will engage the arm, but when the disk is spaced from the rear frame these fingers will be out of the path of movement of the arm so as to prevent operation of the striking mechanism.

By providing the double grooved pulleys 36 on the shaft 17, a belt 46 may be placed thereon and a number of feeding devices operated by a single mechanism as shown in Figure 1.

It is believed that when the foregoing description is read in connection with the accompanying drawings, that the construction, operation and advantages of the invention will be apparent.

The invention is susceptible of various changes in its form, proportions and minor details of construction and the right is reserved to make such changes as properly fall within the scope of the appended claims.

Having described the invention, what is claimed is:—

1. A poultry feeder embodying a hopper provided with a feed outlet, an agitator within said hopper, a time mechanism including a striking mechanism connected to said agitator whereby the latter will be operated to force feed from the hopper at regular intervals and a stud actuated cam positioned upon the arbor of the hour hand and controlling the operation of the striking mechanism to automatically and alternately interrupt and resume operation of the agitator at predetermined intervals.

2. A poultry feeder embodying a hopper provided with a feed outlet, an agitator within said hopper, a time mechanism including a striking mechanism connected to said agitator, whereby the latter will be operated to force feed from the hopper at regular intervals, a cam slidingly mounted upon the arbor of the hour hand and a stationary stud engageable with said cam for operating the latter to automatically interrupt operation of the agitator at predetermined intervals.

In testimony whereof I affix my signature.

EMERY M. ROBINSON.